(12) United States Patent
Goettle et al.

(10) Patent No.: US 11,778,703 B2
(45) Date of Patent: Oct. 3, 2023

(54) EMERGENCY LIGHTING SYSTEM WITH DIFFERENTIAL DIMMING

(71) Applicant: McWong Inc., Sacramento, CA (US)

(72) Inventors: Blane Goettle, Golden River, CA (US); Yan Zhou, Sacramento, CA (US); Michael Darren Musgrove, Dixon, CA (US); Guangjun Ouyang, Sacramento, CA (US)

(73) Assignee: McWong Inc, Sacramento, CA (US)

( * ) Notice: Subject to any disclaimer, the term of this patent is extended or adjusted under 35 U.S.C. 154(b) by 0 days.

(21) Appl. No.: 17/300,822

(22) Filed: Nov. 18, 2021

(65) Prior Publication Data

US 2022/0086976 A1 Mar. 17, 2022

Related U.S. Application Data

(63) Continuation of application No. 16/974,223, filed on Nov. 18, 2020, now Pat. No. 11,184,963.

(60) Provisional application No. 62/974,233, filed on Nov. 20, 2019.

(51) Int. Cl.
*H05B 45/10* (2020.01)
*H05B 47/19* (2020.01)
*F21S 9/02* (2006.01)
*F21Y 115/10* (2016.01)
*H04W 84/18* (2009.01)

(52) U.S. Cl.
CPC .............. *H05B 45/10* (2020.01); *F21S 9/022* (2013.01); *H05B 47/19* (2020.01); *F21Y 2115/10* (2016.08); *H04W 84/18* (2013.01)

(58) Field of Classification Search
CPC ........... H02J 13/00004; H02J 13/00028; H02J 13/00034; H02J 13/0079; H02J 2300/24; H02J 2310/14; H02J 3/14; H02J 3/381; H02J 3/383; H02J 3/466; H02J 7/35; H05B 47/105; H05B 47/11; H05B 47/115; H05B 47/175
See application file for complete search history.

(56) References Cited

U.S. PATENT DOCUMENTS 10,432,021 B2 10/2019 Shen et al.
2020/0050753 A1* 2/2020 Davis ..................... G01R 22/10

* cited by examiner

*Primary Examiner* — Monica C King
(74) *Attorney, Agent, or Firm* — James A. Gavney, Jr; JAG Patent Services

(57) ABSTRACT

An emergency lighting system uses a wireless mesh network to control the dimming of luminaires in the event of a power failure or a power outage. Luminaires are commissioned to different dimming power levels depending on localized lighting needs during the power failure of power outage.

12 Claims, 3 Drawing Sheets

EMERGENCY LIGHTING SYSTEM WITH DIFFERENTIAL DIMMING

RELATED APPLICATION

This application is a continuation application of the co-pending U.S. patent application Ser. No. 16/974,223, and titled "EMERGENCY LIGHTING SYSTEM WITH DIFFERENTIAL DIMMING", which claims priority under 35 U.S.C. § 119(e) from the U.S. provisional patent application Ser. No. 62/974,233, filed on Nov. 20, 2019, and titled "WIRELESS MESH DIMMING SYSTEM FOR EMERGENCY LIGHTING." The co-pending U.S. patent application Ser. No. 16/974,223, and titled "EMERGENCY LIGHTING SYSTEM WITH DIFFERENTIAL DIMMING" and the U.S. provisional patent application Ser. No. 62/974,233, filed on Nov. 20, 2019, and titled "WIRELESS MESH DIMMING SYSTEM FOR EMERGENCY LIGHTING" are both hereby incorporated by reference.

FIELD OF THE INVENTION

The present disclosure relates to the technical field of lighting, and more specifically relates to a lighting system with emergency differential dimming.

BACKGROUND OF THE INVENTION

Emergency lighting is often initiated after a power failure or power outage in a building, or a portion thereof, to maintain a level of lighting that is safe for the occupants in, or persons leaving or entering the building of the portion thereof where the power failure has occurred. These emergency lighting systems use battery power packs/inverters that keep a portions of the lights on, or a portion of the lights on at a reduced power level. In many of these emergency lighting systems the battery power packs/inverters are only connected to a selected number of light fixtures to achieve the reduced power levels required by the battery power packs/inverters.

U.S. Pat. No. 10,432,021 B2 teaches an emergency lighting system that detects power failures or power outages using a detecting module and then dims lights to a reduced power level using dimming module.

SUMMARY OF INVENTION

The present invention is directed to an emergency lighting system that uses a wireless mesh network to control dimming of lights at different levels depending on the locations and/or commissioned dimming levels that are coded, programmed or set for different light fixtures within a lighting control group; referred to herein as differential dimming.

The lighting systems of the present include a first light fixture or assembly of the light fixtures that is connected to a first lighting wireless control module to form a first lighting control set. The lighting system further includes a second light fixture or assembly of light fixtures that is connected to a second lighting wireless control module to form a second lighting control set. There can be any number of lighting control sets within the emergency lighting system of the present invention, as long as all of the lighting control sets operate at dimming power levels that add up to a power level that is at or below the maximum rated power threshold of the system, as explained in detail below.

The lighting system of the present invention also includes a dimming micro-inverter that is electrically coupled to the light fixtures in each of the lighting control sets. The dimming micro-inverter is also electrically coupled to an inverter wireless control module to form a control center. The inverter wireless control module and the lighting wireless control modules for each of the lighting control sets communicate with each other over a wireless mesh network to form a lighting control group.

In operation, when the control center or the dimming micro-inverter detects a power failure or power outage, the inverter wireless control module sends out or broadcasts dimming signals to each of the lighting control sets within the control group. When dimming signals are received by the lighting control modules, the lighting control modules then instruct the light fixtures in the respective lighting control sets to operate at dimming power levels, wherein the dimming power levels collectively do not exceed the maximum power rating for the dimming micro-inverter.

Prior to any power loss event, each of the lighting control sets within the lighting control group are preferably commissioned with a maximum-power setting to operate at when the lighting control system is operating under normal operating conditions. For example, the first lighting control set can be commissioned to operate at 40% of its maximum power and the second lighting control set can be commissioned to operate at 100% of its maximum power under normal operating conditions.

The lighting control sets within the lighting control group are also preferably commissioned with dimming power levels that lighting control sets within the lighting control group are instructed to be changes to when a power failure or power outage is detected, as described above. For example, the first lighting control set can be commissioned to operate at a dimming power level of 30% max power in the event of a power failure or power outage, while the second lighting control set can be commissioned to operate at 20% of the maximum power in the event of a power failure or power outage. As described above, system features of the present invention allows light fixtures or luminaires within different lighting control sets of the control group to be commissioned with different dimming power levels. Differential dimming allows places that need more light during a power failure or power outage, such as hallways, stair wells and egresses, to maintain a sufficient level of light that is safe for occupants and/or people exiting and entering a building where the power failure or power outage has occurred while minimizing the amount of light at locations within the building where the power failure or power outage has occurred that for example have ambient light and/or otherwise do not require much light to remain safe.

Regardless of what the dimming power levels are for each of the lighting control sets, the dimming power levels are commissioned such that the sum of the dimming power levels of all of the lighting control sets within the lighting control group does not exceed the maximum power rating for the dimming micro-inverter. For example, if the dimming micro-inverter is rated for 60 Watts of maximum power, then all of the dimming power levels of all of the lighting control sets within the lighting control group are commissioned such that the sum of the dimming power levels will not exceed 60 Watts in the event of a power failure or power outage.

The wireless control modules that are coupled to the light fixtures, or control sets and the wireless control module that is couple to the micro-inverter preferably operate using a Bluetooth communication protocol over the wireless mesh network formed by all of the control modules.

Bluetooth Mesh is a mesh networking standard that operates on a flood network principle.

Flooding is a simple routing technique in computer networks where a source or node sends packets through every outgoing link.

Flooding, which is similar to broadcasting, occurs when source packets (without routing data) are transmitted to all attached network nodes. Because flooding uses every path in the network, the shortest path is also used. The flooding algorithm is easy to implement. The Mesh is based on the nodes relaying the messages wherein every relay node that receives a network packet that authenticates against a known network key that is not in message cache. For the purpose of this application it is understood that broadcasting can mean operating in accordance with a flood network protocol.

DETAILED DESCRIPTION OF THE INVENTION

Figure 1:
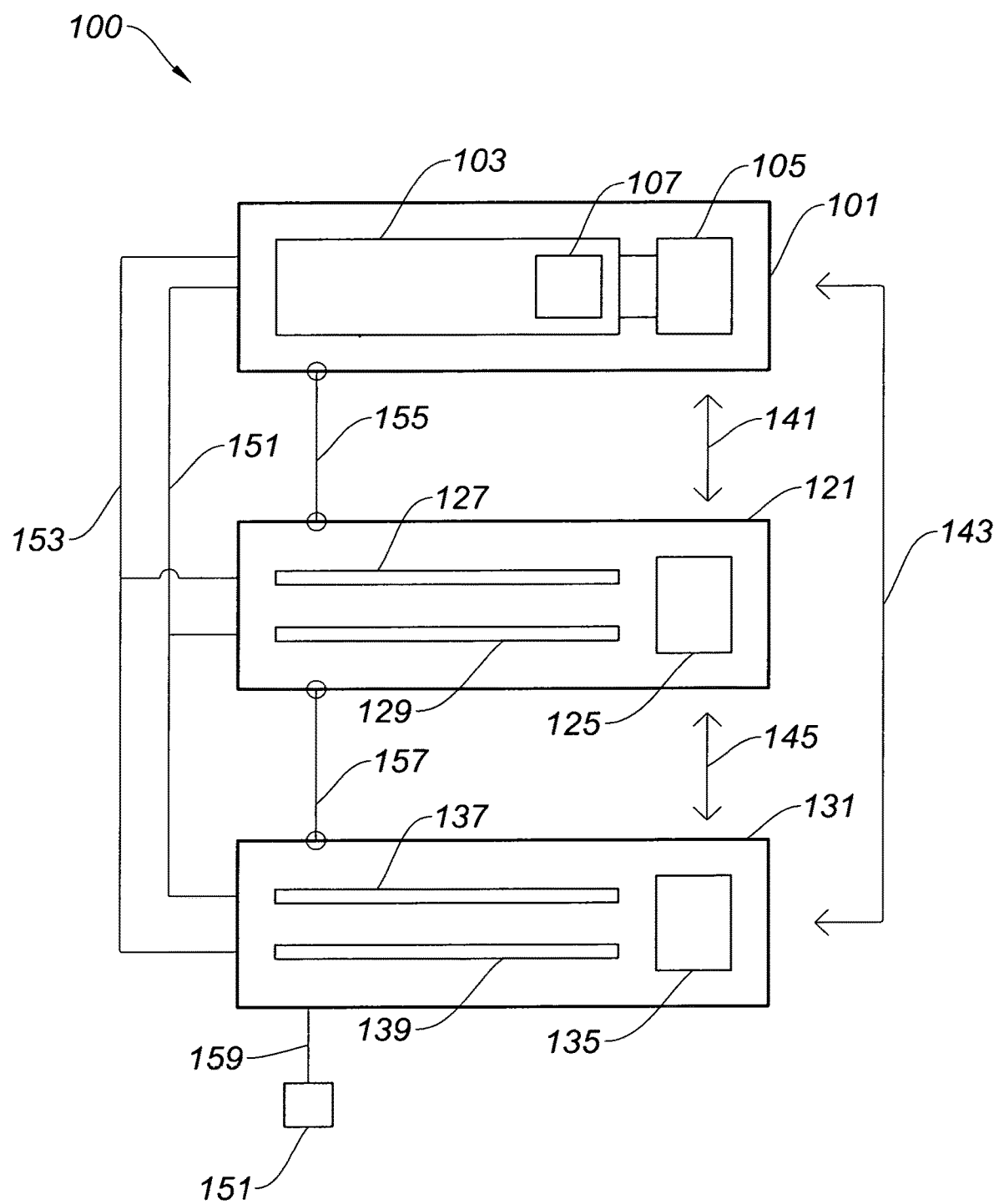
FIG. 1 shows a schematic block diagram of an emergency lighting system with deferential dimming, in accordance with the embodiments of the invention.

FIG. 1 illustrates a lighting control group or lighting system 100 of the present invention that includes a first light fixture or assembly of the light fixtures 127 and 129 that is connected to a first lighting wireless control module 125 to form a first lighting control set 121. The lighting system 100 further includes a second light fixture or assembly of light fixtures 137 and 139 that is connected to a second lighting wireless control module 135 to form a second lighting control set 131. There can be any number of lighting control sets within the emergency lighting system 100 of the present invention, as long as all of the lighting control sets operate at dimming power levels that total to a power value at or below the maximum rate power threshold of the system, as explained in detail below.

The lighting system 100 of the present invention also includes a dimming micro-inverter 103 with a with a back-up battery 107 that is electrically coupled to the light fixtures or luminaires 127/129 and 137/139 in each of the lighting control sets 121 and 131. The dimming micro-inverter 103 is also electrically coupled to an inverter wireless control module 105 to form a control center 101. The inverter wireless control module 105 and the lighting wireless control modules 125 and 135 from each of the lighting control sets 121 and 131 communicate with each other over a wireless mesh network, as indicated by the arrows 141, 143 and 145 to form a lighting control group or lighting system 100. For simplicity of the description of the invention, lighting control group and lighting system 100 are used interchangeably.

In operation, when the control center 101 or dimming micro-inverter 103 detects a power failure or power outage the inverter wireless control module 105 sends out or broadcasts dimming signals to each of the lighting control sets 121 and 131 within the lighting control group 100. The lighting wireless control modules 125 and 135 then instruct the light fixtures or luminaires 127/129 and 137/139 within the lighting control sets 121 and 131 to change to and to operate at dimming power levels, wherein the dimming power levels collectively do not exceed the total power restriction or maximum power rating of the dimming micro-inverter 103.

Prior to any power loss event, each of the lighting control sets 121 and 131 within the lighting system 100 can be commissioned with a maximum power setting to operate at when the lighting system is operating under normal power conditions. For example, the first lighting control set 121 can be commissioned to operate at 40% of its maximum power and the second lighting control set 131 can be commissioned to operate at 100% of its maximum power under normal operating power conditions.

The lighting control sets 121 and 131 within the lighting system 100 are preferably commissioned with dimming power levels that the light fixtures or luminaires 127/129 and 137/139 are instructed reduce to in the event of power outage or power failure. For example, the first lighting control set 121 can be commissioned to operate the light fixtures or luminaires 127 and 129 at a dimming power level of 30% maximum power in the event of a power outage or power failure, while the second lighting control set 131 can be commissioned to operate light fixtures or luminaires 137 and 139 at 20% of the maximum power in the event of a power outage or power failure. As described above, lighting system or control group 100 allows fixtures or luminaires 127/129 and 137/139 within different lighting control sets 127 and 137 to exhibit or have different dimming power levels; a feature that is referred to herein as differential dimming.

Differential dimming allows places that need more light during a power outages, such as hallways, stair wells and egresses to maintain a sufficient level of light that is safe for occupants or people exiting and entering a building where the power outage or power failure, while minimizing the amount of light at locations within the building that have ambient light or otherwise do not require much light to remain safe. The commissioning of maximum power settings and dimming power levels of the lighting control sets 127 and 137 is accomplished by wireless programing, wired programming, switches or a combination thereof. It is understood that the lighting control sets 127 and 137 and the control center 101 can include any number of micro-computers with memory and micro-processors for running lighting firmware.

Regardless of what the dimming power levels are for each of the lighting control sets, the dimming power levels are commissioned such that the sum of the dimming power levels of all of the lighting control sets within the lighting system does not exceed the maximum power rating for the dimming micro-inverter. For example, if the dimming micro-inverter is rated for 60 Watts of maximum power, then the total dimming power levels of all of the light fixtures or luminaires 127/129 and 137/139 are commissioned for dimming power levels that collectively will not exceed 60 Watts in the event of a power outage or power failure. It is understood that all fixtures or luminaires 127/129 and 137/139 within different lighting control sets 127 and 137 have the required wiring, represented by 155, 157 and 159, and drivers circuits, represented by 151 and 153, to power the light fixtures or luminaires 127/129 and 137/139.

Figure 2:
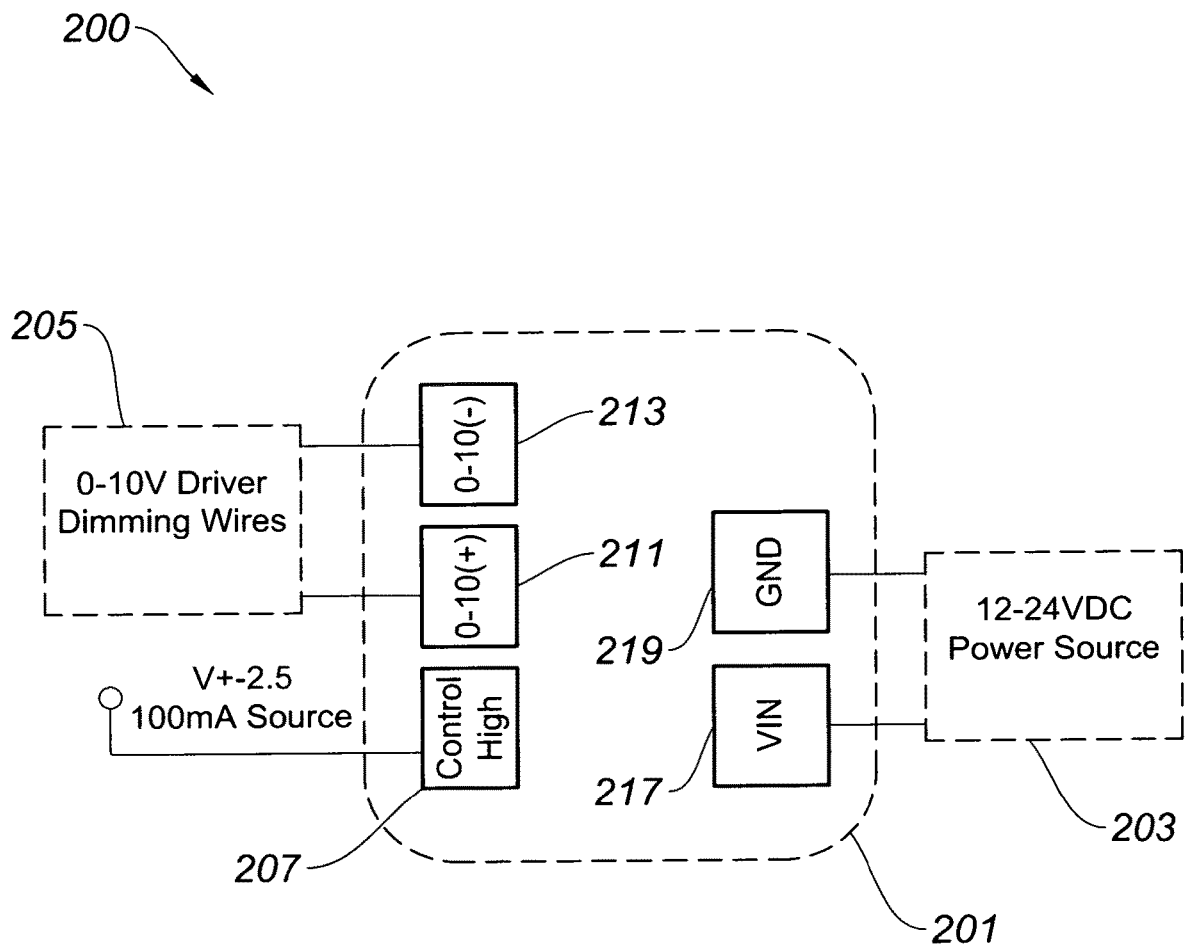
FIG. 2 shows a simplified wiring diagram of a control module used to form a wireless mesh network to control differential dimming, in accordance with the embodiments of the invention.

FIG. 2 shows a simplified wiring diagram 200 of a control module 201, such as the inverter wireless control module 105 and the lighting wireless control modules 125 and 135. The control module 201 is coupled to the 0-10V dimming wires 213 through contacts 211 and 213 and is coupled to back-up battery 203 through the contacts 217 and 219. The control module 201 also includes a high control contact 207 that is used to trigger switches or relays. As stated above, the inverter wireless control module 105 and the lighting wireless control modules 125 and 135 preferably communicate within the lighting control group of system 100 (FIG. 1) over a wireless mesh network using Bluetooth communication protocol.

Figure 3:
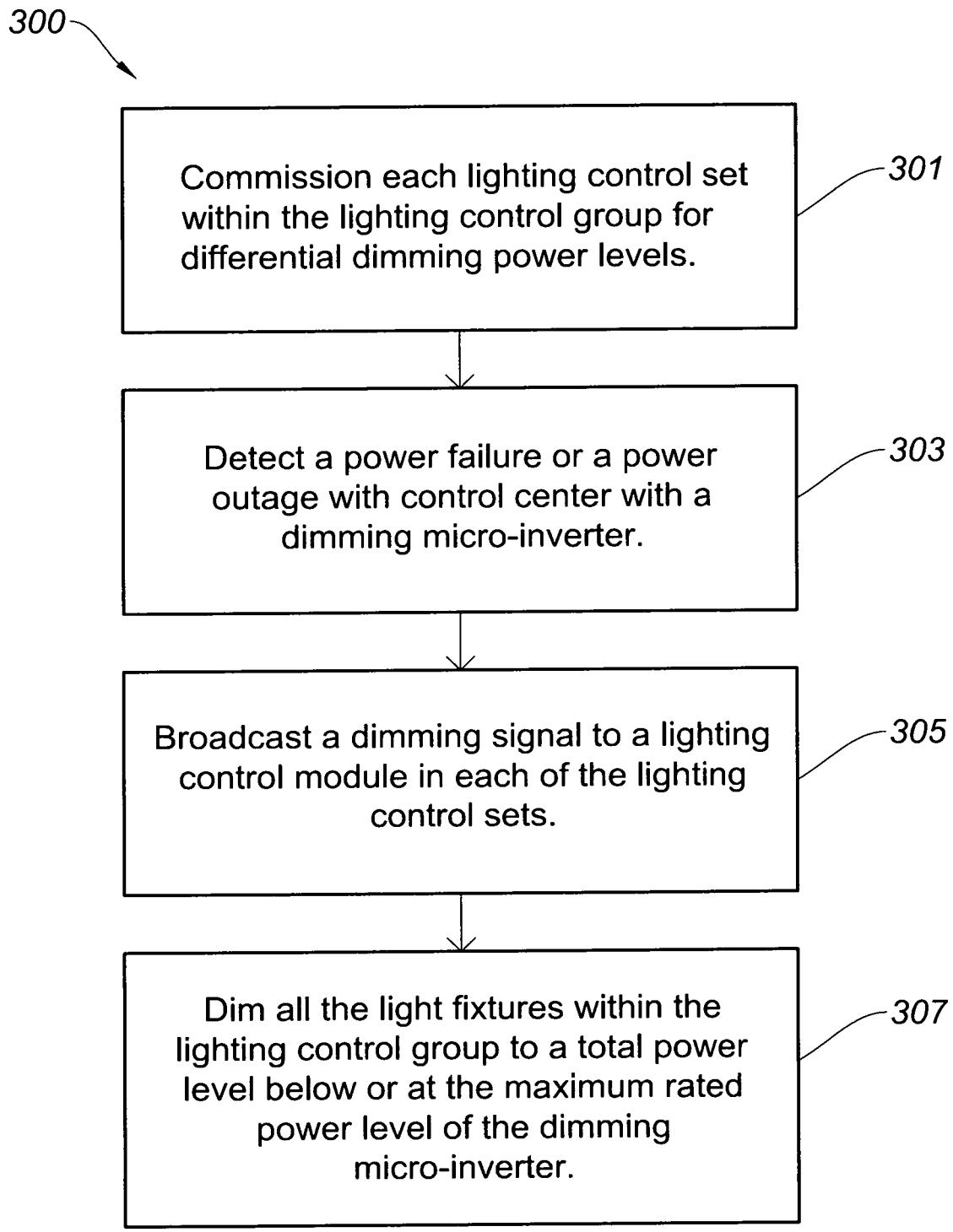
FIG. 3 shows a block-flow diagram outlining steps for controlling deferential dimming, in accordance with the method of the present invention.

In accordance with the method of the present invention out-lined in FIG. 3, in the step 301 each of the lighting control sets 121 and 131 (FIG. 1) within the lighting control group 100 are commissioned with differential dimming power levels through the lighting control modules 125 and 135, wherein the dimming power levels are suitable for the power restrictions of the emergency lighting system 100 and/or dimming micro-inverter 103. As described above, the lighting control sets 121 and 131 can also be commissioned for a maximum power level to operate at under normal power conditions. After the lighting control sets 121 and 131 have been commissioned with differential dimming power levels in the step 301, then in the step 303 the control center 101 or the dimming micro-inverter 103 detects when power failures or power outages occur. When the control center 101 or the dimming micro-inverter 103 detects a power failure or power outage in the step 303, then in the step 305 the inverter control module 105 initiates a broadcast of dimming signals to each of the lighting control modules 125 and 135 over a mesh network and then in the step 307, the lighting control modules 125 and 135 dim the light fixtures or luminaires 127/129 and 137/139 to their respective differential dimming power levels, wherein the total power level of both of the lighting control sets 121 and 131 is at or below the maximum rated power level of the dimming micro-inverter 103.

The present invention has been described in terms of specific embodiments incorporating details to facilitate the understanding of the principles of construction and operation of the invention. As such, references herein to specific embodiments and details thereof are not intended to limit the scope of the claims appended hereto. For example, while luminaires are typically dimmed to a lower power level in the event of a power failure or power outage, some light fixtures can be commissioned to increase power to output more light in the event of a power failure or power outage. It will be apparent to those skilled in the art that modifications can be made in the embodiments chosen for illustration without departing from the spirit and scope of the invention.

What is claimed is:

1. A lighting system comprising:
a) lighting control sets each with one or more luminaires commissioned to operate at a maximum power level and lighting control modules for controlling power levels of the lighting control sets; and
b) a control center electrically coupled to each of the lighting control sets, the control center comprising a dimming micro-inverter with a back-up battery and a dimming control module, wherein the control center detects power failures, and in response to the power failure broadcast differential dimming signal to each the lighting control sets and powers the lighting control sets with the back-up battery at differential dimming power levels, such that the sum of the differential dimming power levels is at or below the maximum operating power level for the dimming micro-inverter.

2. The lighting system of claim 1, wherein the lighting control modules and the dimming control module form a group that communicate with each other over a wireless mesh network.

3. The lighting system of claim 1, wherein portions of the lighting control sets are commissioned with a range of the differential dimming power levels based on locations of the lighting control sets.

4. The lighting system of claim 1, wherein portions of the lighting control sets are commissioned to operate at different power levels in the absence of the power failure.

5. The lighting system of claim 1, wherein the one or more luminaires are LED luminaires.

6. A lighting system comprising one or more control lighting groups, with each of the lighting control groups comprising:
a) a first lighting control set commissioned to operate at a first maximum power level and comprising one or more luminaires and a first light lighting control module for controlling operating power levels of the first lighting control set;
b) a second lighting control set commissioned to operate at a second maximum power level and comprising one or more luminaires and a second lighting control module for controlling operating power levels of the second lighting control set; and
c) a control center with a dimming micro-inverter with a back-up battery and an inverter control module, wherein the control center detects power failures and in response to detected power failures the inverter control module broadcasts dimming signals that instruct the first lighting control module and the second lighting control module to change the operating power levels of the first lighting control set and the operating power levels of the second lighting control set from the first maximum power level and the second maximum power level to different dimming power levels and wherein the sum of the dimming power levels of the first lighting control set and the dimming power levels of the second lighting control set are at or below the maximum operating power level for the dimming micro-inverter.

7. The lighting system of claim 6, wherein the one or more luminaires, the one or more luminaires in the first lighting control set and the second lighting control set are LED luminaires.

8. The lighting system of claim 6, wherein different dimming power levels of the first lighting control set and the second lighting control set total to a value that is at below maximum rated power level of the dimming micro-inverter.

9. The lighting system of claim 6, wherein the first lighting control set and the second lighting control set are commissioned with the different dimming power levels.

10. The lighting system of claim 6, wherein the first lighting control set and the second lighting control set are commissioned to operate at different power levels in the absence of the power failure.

11. The lighting system of claim 6, wherein the first lighting control module, the second lighting control module and the dimming control module communicate with each other over a wireless mesh network.

12. A method for controlling a lighting system during a power failure comprising:
a) forming lighting control group, the lighting control group comprising lighting control sets connected to a dimming micro-inverter and a control center with control modules that communicate between each other over a wireless mesh network, wherein the dimming micro-inverter powers the lighting control sets in the event of a power failure;

b) commissioning each lighting control set for operating at a maximum power levels in the absence of the power failure and for differential dimming power levels;

c) detecting the power failure from the control center; and d) broadcasting a dimming signal from at least one of the control modules and thereby instructing the lighting control sets to change operating power levels to the differential dimming power levels, wherein the differential dimming power levels total to a power value that is at or below maximum rated power level of the dimming micro-inverter.

* * * * *